United States Patent
Yamagishi et al.

(10) Patent No.: US 8,704,873 B2
(45) Date of Patent: Apr. 22, 2014

(54) RECEIVING STREAM DATA WHICH MAY BE USED TO IMPLEMENT BOTH TWO-DIMENSIONAL DISPLAY AND THREE-DIMENSIONAL DISPLAY

(75) Inventors: Yasuaki Yamagishi, Kanagawa (JP); Naohisa Kitazato, Tokyo (JP)

(73) Assignee: Sony Corporation (JP)

( * ) Notice: Subject to any disclaimer, the term of this patent is extended or adjusted under 35 U.S.C. 154(b) by 348 days.

(21) Appl. No.: 12/925,102

(22) Filed: Oct. 14, 2010

(65) Prior Publication Data

US 2011/0099285 A1    Apr. 28, 2011

(30) Foreign Application Priority Data

Oct. 28, 2009 (JP) ............................... P2009-247516

(51) Int. Cl.
*H04N 13/00* (2006.01)
*H04N 15/00* (2006.01)

(52) U.S. Cl.
USPC ............... 348/42; 348/43; 348/51; 348/58; 709/223; 709/231

(58) Field of Classification Search
USPC ............... 709/223, 231, 232, 203, 230, 227; 348/42, 58, 43, 51; 382/284; 375/240
See application file for complete search history.

(56) References Cited

U.S. PATENT DOCUMENTS

| | | | | |
|---|---|---|---|---|
| 5,394,524 A * | 2/1995 | DiNicola et al. | ............... | 345/506 |
| 6,898,320 B2 * | 5/2005 | Han et al. | ............... | 382/232 |
| 7,177,357 B2 * | 2/2007 | Yun et al. | ............... | 375/240.01 |
| 8,045,588 B2 * | 10/2011 | Lee et al. | ............... | 370/475 |
| 2003/0095177 A1 * | 5/2003 | Yun et al. | ............... | 348/42 |
| 2003/0108101 A1 * | 6/2003 | Frossard et al. | ............... | 375/240.03 |
| 2004/0066846 A1 * | 4/2004 | Yun et al. | ............... | 348/58 |
| 2005/0017968 A1 * | 1/2005 | Wurmlin et al. | ............... | 345/419 |
| 2008/0310499 A1 * | 12/2008 | Kim et al. | ............... | 348/42 |
| 2009/0263029 A1 * | 10/2009 | Chang et al. | ............... | 382/232 |
| 2010/0165077 A1 | 7/2010 | Yin et al. | | |
| 2011/0181693 A1 * | 7/2011 | Lee et al. | ............... | 348/43 |
| 2012/0026287 A1 * | 2/2012 | Tsukagoshi | ............... | 348/43 |
| 2012/0201515 A1 * | 8/2012 | Kanemaru et al. | ............... | 386/248 |
| 2013/0169762 A1 * | 7/2013 | Kanemaru et al. | ............... | 348/51 |
| 2013/0291017 A1 * | 10/2013 | Cho et al. | ............... | 725/45 |

FOREIGN PATENT DOCUMENTS

| | | |
|---|---|---|
| JP | 2009-513074 T | 3/2009 |
| WO | 2006041784 A2 | 4/2006 |
| WO | WO-2007/047736 A2 | 4/2007 |
| WO | 2007064159 A1 | 6/2007 |

(Continued)

OTHER PUBLICATIONS

European Search Report EP 10188195, dated Feb. 3, 2011.

(Continued)

*Primary Examiner* — Ramy M Osman
(74) *Attorney, Agent, or Firm* — Lerner, David, Littenberg, Krumholz & Mentlik, LLP

(57) ABSTRACT

There is provided a stream receiving device including an information receiving unit for receiving stream control information for a 3D stream to be distributed from an exterior over a network, the stream control information being described using metadata, a stream securing unit for executing a process related to securing of the 3D stream to be distributed using the stream control information received by the information receiving unit before the 3D stream is distributed, and reserving the stream, and a stream receiving unit for receiving the 3D stream distributed over the network based on the result of reservation in the stream securing unit.

9 Claims, 8 Drawing Sheets

(56) References Cited

FOREIGN PATENT DOCUMENTS

| | | | |
|---|---|---|---|
| WO | 2008038961 | A1 | 4/2008 |
| WO | 2008054100 | A1 | 5/2008 |
| WO | 2008069613 | A1 | 6/2008 |

OTHER PUBLICATIONS

Hyun Lee et al: "A Structure for 2D/3D Mixed Service Based on Terrestrial DMB System" 3DTV Conference, 2007, IEEE, PI May 1, 2007, pp. 1-4, XP 031158177.

\* cited by examiner

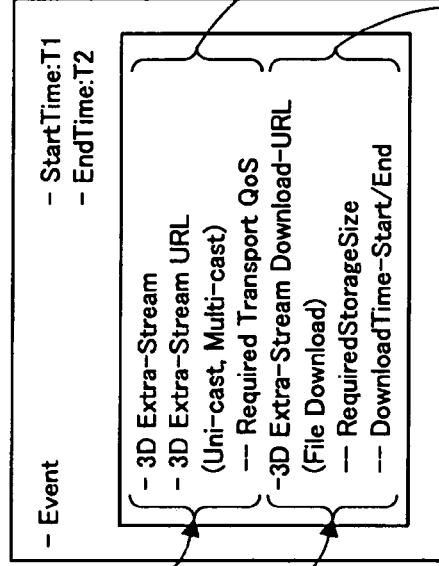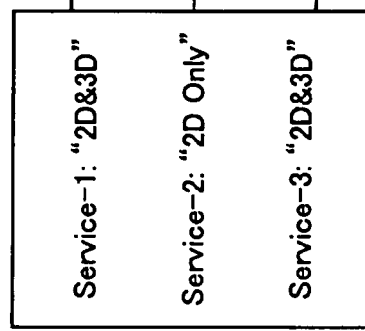
FIG. 1

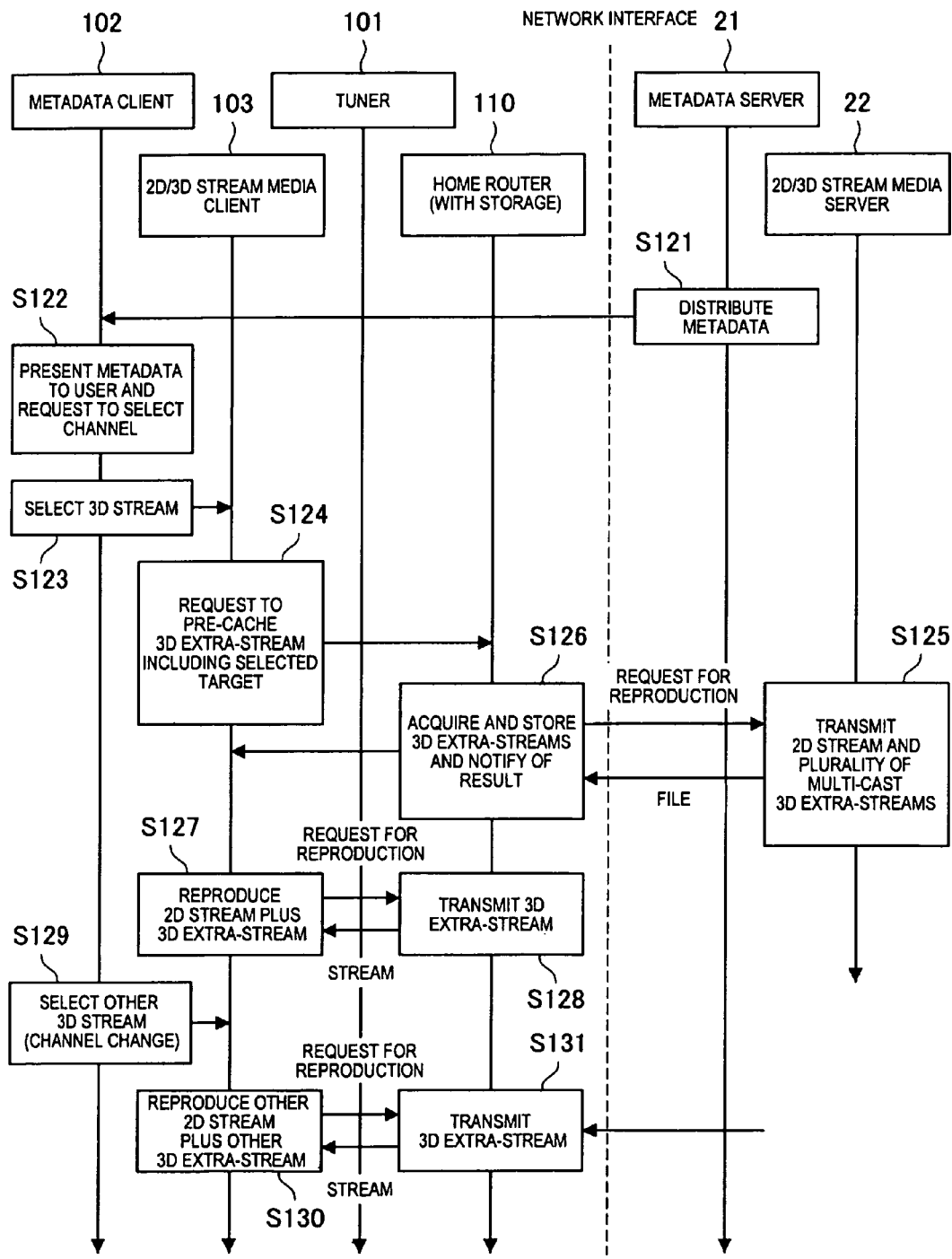

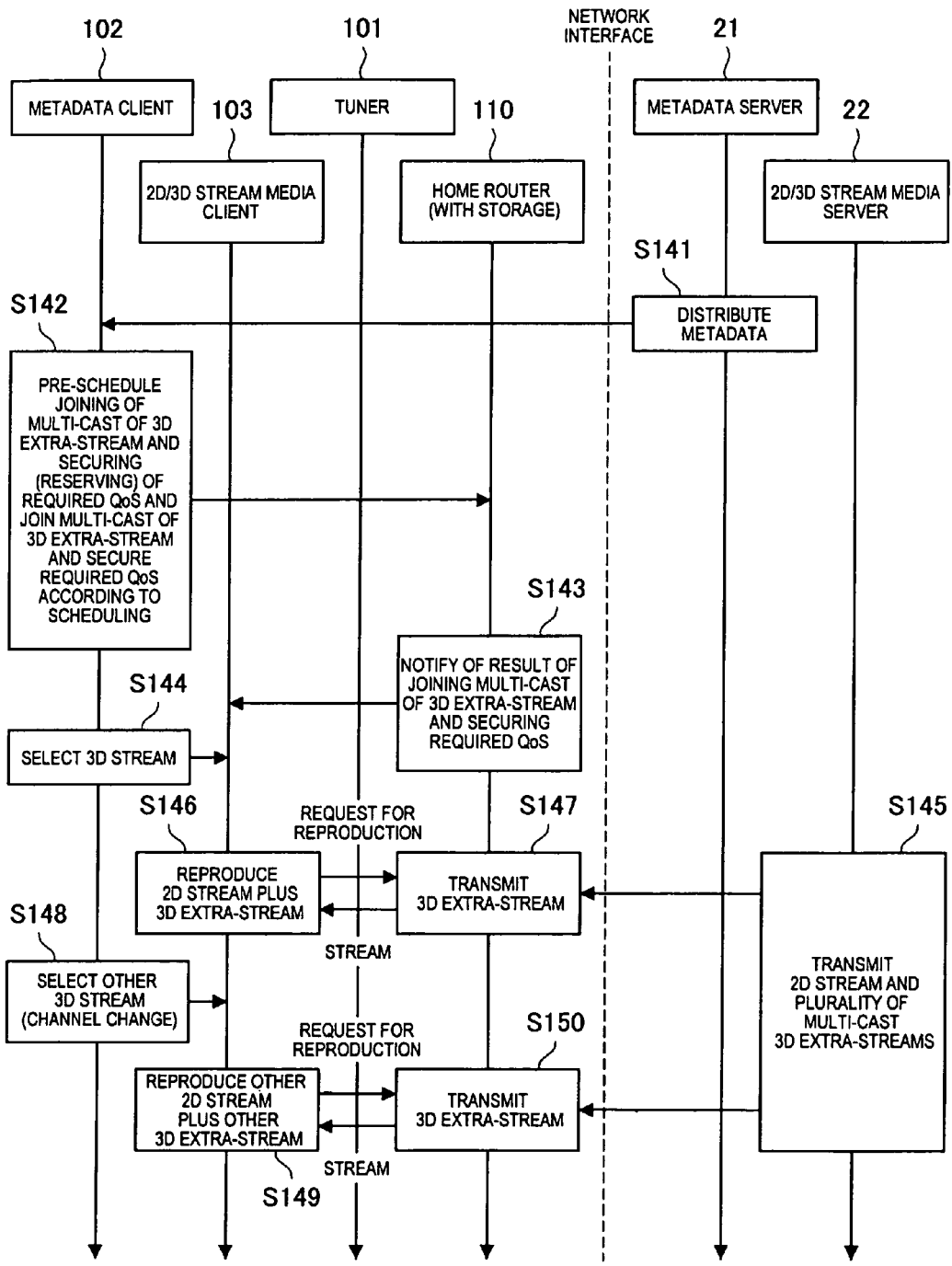

RECEIVING STREAM DATA WHICH MAY BE USED TO IMPLEMENT BOTH TWO-DIMENSIONAL DISPLAY AND THREE-DIMENSIONAL DISPLAY

CROSS-REFERENCE TO RELATED APPLICATION

The present application claims priority from Japanese Patent Application No. JP 2009-247516 filed in the Japanese Patent Office on Oct. 28, 2009, the entire content of which is incorporated herein by reference.

BACKGROUND OF THE INVENTION

1. Field of the Invention

The present invention relates to a stream receiving device, a stream receiving method, a stream transmission device, a stream transmission method and a computer program.

2. Description of the Related Art

Standardization of three-dimensional (3D) broadcasting for allowing a viewer to view 3D images has been conducted by a standardization group for each broadcasting system. A mixture of an existing 2D broadcast program (2D program) and a 3D broadcast program (3D program) is considered as a broadcasting organization format. In contrast with 3D broadcasting, an existing broadcasting system is referred to as "2D broadcasting."

Multi view coding (MVC) is a scheme of organizing a 3D stream in a 3D broadcast program (e.g., see Japanese Patent Application No. 2009-T-513074). In the MVC, a program includes a 2D stream that can be independently viewed as a 2D broadcast, and a stream for expanding a 2D broadcast into a 3D broadcast, which is processed in synchronization with the 2D stream. FIG. 11 is a diagram illustrating a stream composition in the MVC. According to the MVC, in an existing receiver that allows a 3D program to be viewed only as a 2D program, the 3D program can be viewed in the form of a typical 2D program by processing only a 2D stream.

SUMMARY OF THE INVENTION

However, when a 3D program is broadcast in the organization format as shown in FIG. 11, it is necessary to allocate a band, including a band to be allocated to a 3D extra-stream, to each channel. When a 2D program occupies most of content and a 3D program occupies a small part, the band allocated to the 3D extra-stream becomes an extra band and most of the band becomes useless.

When a 2D program and a 3D program are mixed in a certain time zone and channel switching (zapping) is performed over the 2D program and the 3D program at a receiver side, switching between the 2D program and the 3D program frequently occurs and channel switching takes time. This causes inconvenience of use. In this case, it is necessary to reserve network resources in advance in order to acquire a 3D extra-stream from a network, such as the Internet or a local area network (LAN), and process the 3D extra-stream in synchronization with a 2D stream. This additive resource reservation time causes overhead of a channel zapping time.

In light of the foregoing, it is desirable to provide a stream receiving device, a stream receiving method, a stream transmission device, a stream transmission method and a computer program that are new and enhanced and capable of realizing efficient band management and efficient channel switching at a receiver side in an organization format in which a 3D stream is distributed over a network and a 2D program and a 3D program are mixed.

According to an embodiment of the present invention, there is provided a stream receiving device including an information receiving unit for receiving stream control information for a 3D stream to be distributed from an exterior over a network, the stream control information being described using metadata, a stream securing unit for executing a process related to securing of the 3D stream to be distributed using the stream control information received by the information receiving unit before the 3D stream is distributed, and reserving the stream, and a stream receiving unit for receiving the 3D stream distributed over the network based on the result of reservation in the stream securing unit.

The stream securing unit may execute, in advance, a process of joining a multi-cast for one or at least two 3D streams distributed using multi-cast from the exterior, and secures the 3D stream.

The stream securing unit may pre-cache the 3D stream to secure the 3D stream before one or at least two 3D streams are reproduced.

The stream securing unit may schedule a process of joining a multi-cast for one or at least two 3D streams distributed using multi-cast from the exterior, and may secure the 3D stream.

A mixing state of the 3D stream and a 2D stream may be described in the control information received by the information receiving unit.

Band information of the 3D stream may be described in the control information received by the information receiving unit.

A distribution scheme for the 3D stream may be described in the control information received by the information receiving unit.

A time at which the 3D stream can be downloaded may be described in the control information received by the information receiving unit.

According to another embodiment of the present invention, there is provided a stream receiving method, including the steps of receiving stream control information for a 3D stream to be distributed from the exterior over a network, the stream control information being described using metadata, executing a process related to securing of the 3D stream to be distributed using the stream control information received in the step of receiving the stream control information before the 3D stream is distributed, and reserving the stream, and receiving the 3D stream distributed over the network based on the result of reservation in the step of reserving the stream.

According to another embodiment of the present invention, there is provided a computer program that causes a computer to execute the steps of receiving stream control information for a 3D stream to be distributed from the exterior over a network, the stream control information being described using metadata, executing a process related to securing of the 3D stream to be distributed using the stream control information received in the step of receiving the stream control information before the 3D stream is distributed, and reserving the stream, and receiving the 3D stream distributed over the network based on the result of reservation in the step of reserving the stream.

According to another embodiment of the present invention, there is provided a stream transmission device including an information description unit for describing stream control information for a 3D stream distributed over a network, using metadata, an information transmission unit for transmitting the stream control information for the 3D stream described by the information description unit prior to distribution of the 3D stream, and a stream distribution unit for distributing the 3D stream over the network based on the stream control information for the 3D stream described by the information description unit.

A mixing state of the 3D stream and a 2D stream may be included in the control information described by the information description unit.

Band information of the 3D stream may be included in the control information described by the information description unit.

A distribution scheme for the 3D stream may be included the control information described by the information description unit.

A time at which the 3D stream can be downloaded may be included in the control information described by the information description unit.

According to another embodiment of the present invention, there is provided a stream transmission method, including the steps of describing stream control information for a 3D stream to be distributed over a network, using metadata, transmitting the stream control information for the 3D stream described in the step of describing the stream control information prior to distribution of the 3D stream, and distributing the 3D stream over the network based on the stream control information for the 3D stream described in the step of describing the stream control information.

According to another embodiment of the present invention, there is provided a computer program that causes a computer to execute the steps of describing stream control information for a 3D stream to be distributed over a network, using metadata, transmitting the stream control information for the 3D stream described in the step of describing the stream control information prior to distribution of the 3D stream, and distributing the 3D stream over the network based on the stream control information for the 3D stream described in the step of describing the stream control information.

As described above, according to the present invention, it is possible to provide the stream receiving device, the stream receiving method, the stream transmission device, the stream transmission method and the computer program that are new and enhanced and capable of realizing efficient band management and efficient channel switching at a receiver side in an organization format in which a 3D stream is distributed over a network and a 2D program and a 3D program are mixed.

BRIEF DESCRIPTION OF THE DRAWINGS

FIG. 1 is a diagram illustrating an example of describing information when a stream is transmitted;

FIG. 8 is a flow diagram illustrating a second example of operation of the server 20 and the client 100 according to an embodiment of the present invention;

FIG. 9 is a flow diagram illustrating a third example of operation of a server 20 and a client 100 according to an embodiment of the present invention;

DETAILED DESCRIPTION OF THE EMBODIMENT(S)

Figure 2:
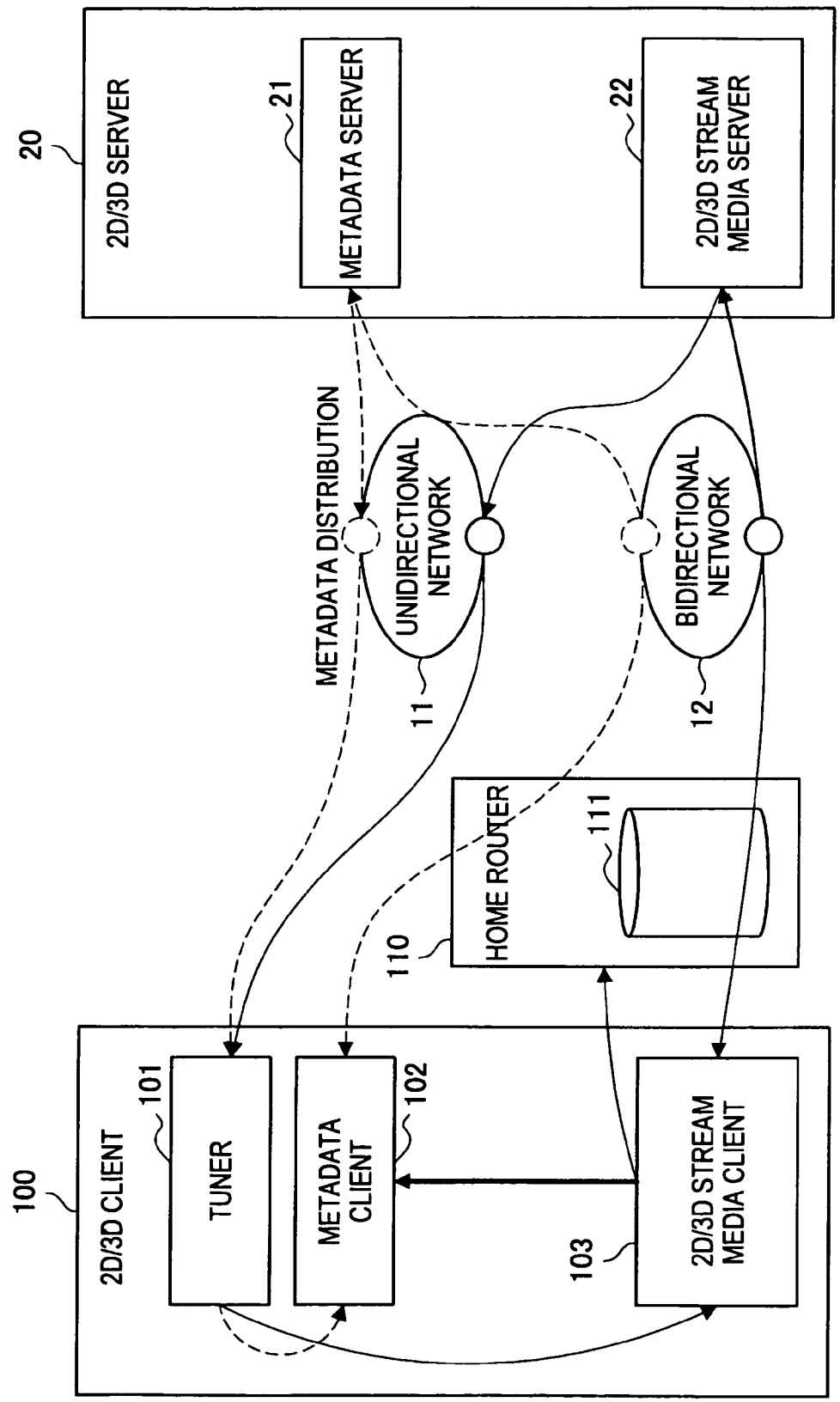
FIG. 2 is a diagram illustrating a configuration of a stream distribution system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
<1. Example of Solution>
[1-1. Basic Information of Stream]
[1-2. Control Information of Stream]
[1-3. Operation of Client]
<2. Embodiment of the Invention>
[2-1. Configuration of Stream Distribution System]
[2-2. Configuration of Metadata Server]
[2-3. Configuration of Metadata Client]
[2-4. Examples of Operation of Server and Client]
[2-4-1. First example of Operation]
[2-4-2. Second example of Operation]
[2-4-3. Third example of Operation]
<3. Conclusion>
<1. Example of Solution>

Hereinafter, an example of a method for resolving the above-described issues will first be described and then an embodiment of the present invention for realizing the method will be described.

[1-1. Basic Information of Stream]

In order to resolve the above-described issues, for example, a method is considered in which a server defines elements for describing various settings about 3D stream transmission in control information, which describes attributes of service (channel), such as ServiceInformation of a service description table (SDT) or TV-Anytimemetadata (TVA) of SI (DVB-SI: service information), in metadata for notifying a client device of stream distribution service such as the SI, or the TVA described using XML. For example, an element about a mixing state of a 2D stream and a 3D stream is defined in the control information describing the attribute of the service (channel), and the above-described information is described in such an element and transmitted to a client. An example of the mixing state of the streams shows that a main stream is 2D in addition to typical service attributes, but there is a stream transmitted to restructure the main stream into 3D in a certain period.

[1-2. Control Information of Stream]

In order to resolve the above-described issues, a method is considered in which a server defines elements about the type of a codec of a 3D extra-stream to be processed in synchronization with a 2D stream (3D Extra-Stream CodecType), an acquisition address (e.g., a multi-cast address (3D Extra-Stream URL), or a file address (3D Extra-Stream File-URL) when the stream can be acquired as a file), as well as typical event attributes such as a start time and an end time of the event, in control information describing attributes of an event in a time period of a certain service of ScheduleEvent of an event information table (EIT) or TVA of the SI, describes the above-described information in such elements, and transmits the information to a client.

When a period in which the transmission of a certain 3D extra-stream is necessary is not the same as a period of an event defined in the EIT or ScheduleEvent, an element for the period in which the 3D extra-stream transmission is necessary may be defined in, for example, a Segment Information of the TVA or the like and may be used. It is assumed that this Segment Information of the TVA is used to describe an attribute of an arbitrary period in a program.

Where the 3D extra-stream is transmitted using multi-cast, Required Transport QoS (necessary band/QoS class (transport quality)), as well as an address, is defined in the control information, and such elements are used to provide information on a band. A client requests to secure resources necessary for a modem or a router over a transmission time zone in advance using the Required Transport QoS.

When the 3D extra-stream is acquired as a file in advance, a storage size necessary for storing the 3D extra-stream in the storage (RequiredStorageSize) and a time zone in which a stream can be downloaded (downloadTime-Start/End), as well as the address, are defined in the control information, and information on the storage size or the time zone are described in such elements and transmitted to the client.

When the 3D extra-stream is acquired as a file in advance, the 3D extra-stream may be not only acquired as a file from the Internet, but also downloaded through a broadcast wave. Accordingly, a broadcast wave slot defined in, for example, digital video broadcasting (DVB), as well as URL information beginning with, for example, HTTP, may be specified as an address of a site from which a file is acquired, described in the control information, and the file may be acquired from the slot.

[1-3. Operation of Client]

The client joins multi-cast of a 3D extra-stream in advance or pre-caches the 3D extra-stream as a file in a local storage based on the information described in such defined elements. The pre-caching also includes accumulating, in advance, the 3D extra-stream in an accumulation device on a LAN to which a client device is connected, and causing a device in the LAN to receive the 3D extra-stream in synchronization with a broadcast wave.

FIG. 1 is a diagram illustrating an example of describing information when the information is described in the elements defined as described above and a stream is transmitted. In FIG. 1, an example of service in which a 2D stream and a 3D extra-stream are mixed and distributed and service in which only the 2D stream is distributed is also shown. Information indicating a mixing state of the streams is described in ServiceInformation of an SDT or a TVA of an SI, and detailed information on the 3D extra-stream is described in ScheduleEvent of an EIT or the TVA of the SI.

In FIG. 1, Event Attributes indicating a creation time of a 3D stream, a 3D Extra-Stream CodecType indicating the type of the 3D stream codec, 3D Extra-Stream URL indicating a site of the 3D stream when the 3D stream is distributed using uni-cast or multi-cast from a server, Required Transport QoS indicating a necessary band or QoS class (transport quality) when the 3D extra-stream is transmitted using multi-cast, 3D Extra-Stream Download-URL indicating a site of the 3D stream when the 3D extra-stream is acquired as a file in advance, RequiredStorageSize indicating a necessary storage size when the 3D stream is stored in a storage, and DownloadTime-Start/End indicating a time zone in which a stream can be downloaded are shown as the detailed information on the 3D extra-stream described in ScheduleEvent of the EIT or the TVA of the SI. The client can efficiently use the band and effectively execute channel zapping by receiving the stream and executing a process based on such information.

<2. Embodiments of the Invention>

[2-1. Configuration of Stream Distribution System]

A configuration of a stream distribution system according to an embodiment of the present invention will now be described. FIG. 2 is a diagram illustrating a configuration of a stream distribution system according to an embodiment of the present invention. Hereinafter, the configuration of the stream distribution system according to the embodiment of the present invention will be described with reference to FIG. 2.

As shown in FIG. 2, in a stream distribution system 10 according to an embodiment of the present invention, a server 20 is connected with a client 100 via a unidirectional network 11 or a bidirectional network 12. Here, the unidirectional network 11 includes a distribution medium of a broadcasting type using, for example, a territorial wave, a satellite broadcast wave, or a cable, and the bidirectional network 12 is a bidirectional communication medium, such as the Internet.

The server 20 transmits a 2D stream or a 3D extra-stream or transmits information on the 3D extra-stream transmitted as an additive of the stream. In the present embodiment, the server 20 includes a metadata server 21 and a 2D/3D stream media server 22. The metadata server 21 generates metadata on the 3D extra-stream, which is transmitted as an additive of the stream. The 2D/3D stream media server 22 transmits the 2D stream or the 3D extra-stream to the client 100 via the unidirectional network 11 or the bidirectional network 12.

The client 100 receives the stream and the metadata distributed from the server 20 and reproduces the stream based on the received metadata. The client 100 includes a tuner 101, a metadata client 102, and a 2D/3D stream media client 103. The tuner 101 receives the stream transmitted from the 2D/3D stream media server 22 and decodes the stream.

The metadata client 102 receives, from the tuner 101, the metadata included in the stream transmitted from the metadata server 21 or the 2D/3D stream media server 22, and parses the received metadata. Reproduction of the stream in the 2D/3D stream media client 103 is controlled by metadata parsing in the metadata client 102.

The 2D/3D stream media client 103 reproduces the stream received by the tuner 101 or the home router 110. The 2D/3D stream media client 103 reproduces the-stream based on the metadata parsing result from the metadata client 102.

The home router 110 may be provided between the client 100 and the bidirectional network 12. The home router 110 may include a storage device 111 for pre-caching streams. The storage device 111 for pre-caching the streams may be included in the client 100 or may be separately provided from the client 100 and the home router 110.

The configuration of the stream distribution system 10 according to the embodiment of the present invention has been described with reference to FIG. 2. A configuration of the metadata server 21 according to an embodiment of the present invention will now be described.

[2-2. Configuration of Metadata Server]

Figure 3:
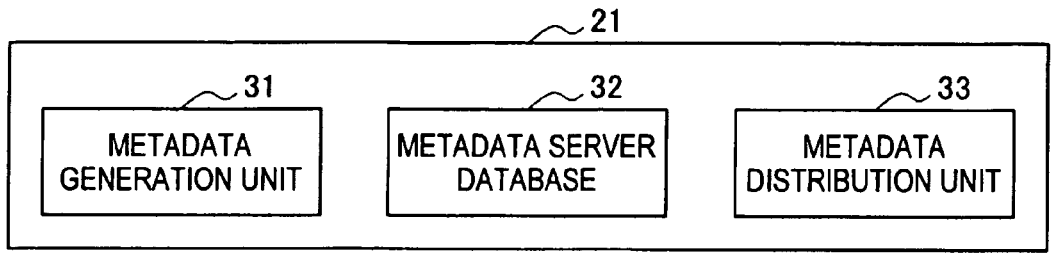
FIG. 3 is a diagram illustrating a configuration of a metadata server 21 according to an embodiment of the present invention.

FIG. 3 is a diagram illustrating a configuration of the metadata server 21 according to an embodiment of the present invention. Hereinafter, the configuration of the metadata server 21 according to the embodiment of the present invention will be described with reference to FIG. 3.

As shown in FIG. 3, the metadata server 21 according to the embodiment of the present invention includes a metadata generation unit 31, a metadata server database 32, and a metadata distribution unit 33.

The metadata generation unit 31 generates metadata. The metadata server database 32 caches the metadata generated by the metadata generation unit 31. The metadata distribution unit 33 transmits the metadata cached in the metadata server database 32 to the client 100 via the unidirectional network 11 or the bidirectional network 12.

Figure 4:
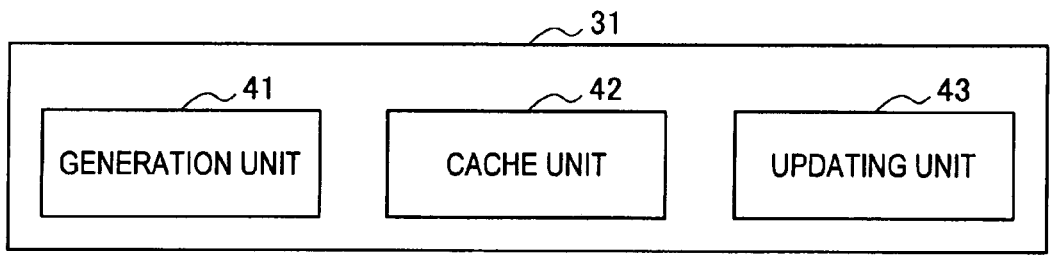
FIG. 4 is a diagram illustrating a configuration of a metadata generation unit 31 included in the metadata server 21 according to an embodiment of the present invention.

Here, a configuration of the metadata generation unit 31 will be described in greater detail. FIG. 4 shows a configuration of the metadata generation unit 31 included in the metadata server 21 according to an embodiment of the present invention.

As shown in FIG. 4, the metadata generation unit 31 includes a generation unit 41, a cache unit 42, and an updating unit 43. The generation unit 41 generates metadata. The metadata generated by the generation unit 41 includes information indicating a mixing state of the streams as described above, and information on a 3D extra-stream. The cache unit 42 caches the metadata generated by the generation unit 41. The updating unit 43 updates the metadata cached in the cache unit 42.

Figure 5:
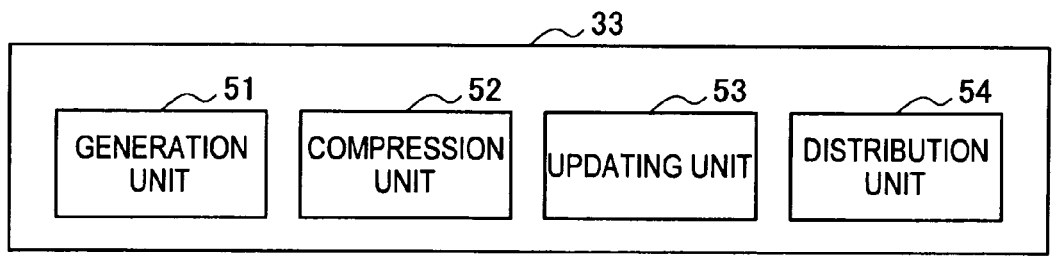
FIG. 5 illustrates a configuration of a metadata distribution unit 33 included in the metadata server 21 according to an embodiment of the present invention.

Subsequently, a configuration of the metadata distribution unit 33 will be described in greater detail. FIG. 5 illustrates a configuration of the metadata distribution unit 33 included in the metadata server 21 according to the embodiment of the present invention.

As shown in FIG. 5, the metadata distribution unit included in the metadata server 21 includes a generation unit 51, a compression unit 52, an updating unit 53, and a distribution unit 54. The generation unit 51 generates a distribution unit of the metadata. The compression unit 52 compresses metadata included in the distribution unit generated by the generation unit 51 to reduce a data amount. The updating unit 53 updates the metadata of the distribution unit. The distribution unit 54 transmits the compressed metadata in the distribution unit to the client 100 via the unidirectional network 11 or the bidirectional network 12.

The configuration of the metadata server 21 according to the embodiment of the present invention has been described with reference to FIGS. 3 to 5. Next, the configuration of the client 100 according to the embodiment of the present invention will be described. A configuration of the metadata client 102 in the client 100 according to the embodiment of the present invention will now be described in detail.

[2-3. Configuration of Metadata Client]

Figure 6:
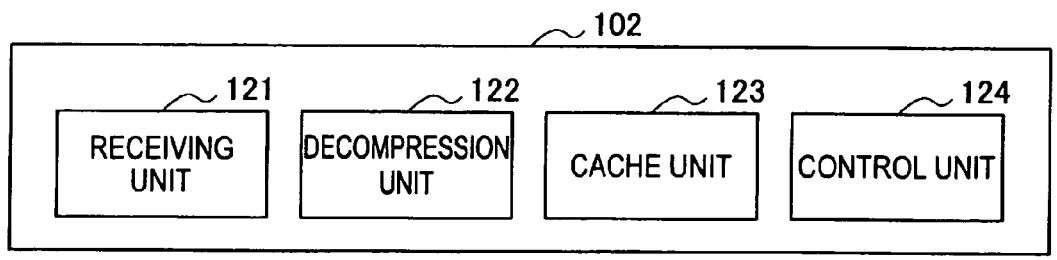
FIG. 6 is a diagram illustrating a configuration of a metadata client 102 included in a client 100 according to the embodiment of the present invention.

FIG. 6 is a diagram illustrating the configuration of the metadata client 102 included in the client 100 according to the embodiment of the present invention. As shown in FIG. 6, the metadata client 102 included in the client 100 according to the embodiment of the present invention includes a receiving unit 121, a decompression unit 122, a cache unit 123, and a control unit 124.

The receiving unit 121 receives the metadata transmitted from the server 20 via the unidirectional network 11 or the bidirectional network 12. The decompression unit 122 decompresses the compressed metadata received by the receiving unit 121. The cache unit 123 caches the metadata decompressed by the decompression unit 122. The control unit 124 controls an operation of the 2D/3D stream media client 103 based on contents of the metadata cached in the cache unit 123.

The metadata client 102 configured as above allows the client 100 to receive the metadata transmitted from the server 20 via the unidirectional network 11 or the bidirectional network 12 and control the operation of the 2D/3D stream media client 103.

The configuration of the metadata client 102 in the client 100 according to the embodiment of the present invention has been described with reference to FIG. 6. Next, an operation of the server 20 and the client 100 according to an embodiment of the present invention will be described.

[2-4. Example of Operation of Server and Client]

[2-4-1. First Example of Operation]

Figure 7:
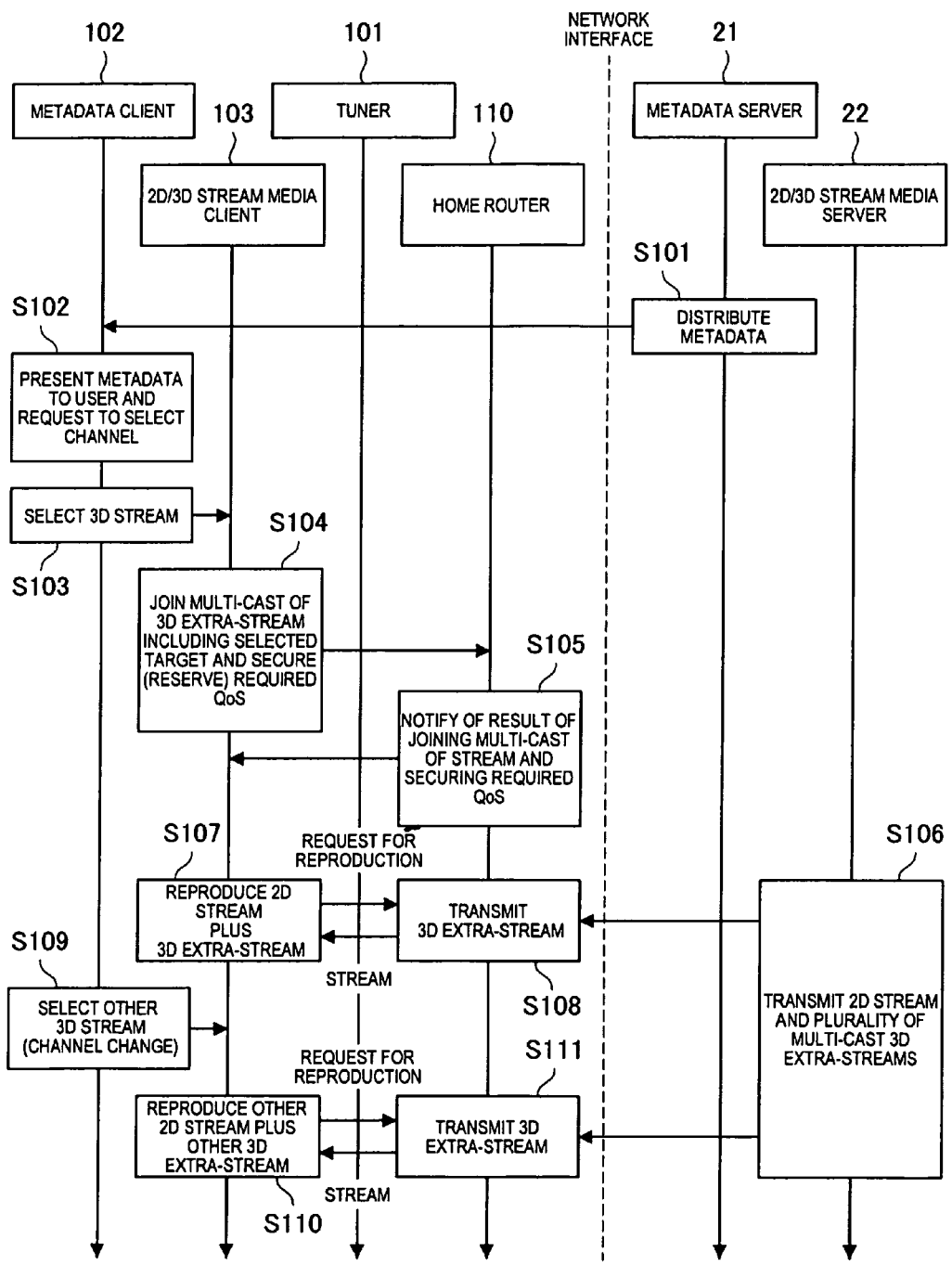
FIG. 7 is a flow diagram illustrating a first example of operation of the server 20 and the client 100 according to an embodiment of the present invention.

FIG. 7 is a flow diagram illustrating a first example of operation of the server 20 and the client 100 according to an embodiment of the present invention. Hereinafter, the first example of operation of the server 20 and the client 100 according to the embodiment of the present invention will be described with reference to FIG. 7. In the first example of operation, 3D extra-streams are transmitted using multi-cast from the server 20, and a plurality of 3D streams are channel-zapped by the client 100.

First, the metadata is transmitted from the metadata server 21 of the server 20 via the unidirectional network 11 or the bidirectional network 12 prior to a 3D program (step S101). When the client 100 receives the metadata transmitted from the metadata server 21 via the unidirectional network 11 or the bidirectional network 12, the metadata client 102 in the client 100 parses the received metadata. Here, the metadata client 102 presents the received metadata to a user of the client 100 or requests the user to select a channel (step S102).

When the metadata client 102 presents the received metadata to the user of the client 100 or requests the user to select the channel and the user of the client 100 selects the channel in step S102, the metadata client 102 instructs the 2D/3D stream media client 103 to receive the channel selected by the user (step S103). The 2D/3D stream media client 103 having received the instruction from the metadata client 102 instructs the home router 110 to join multi-cast of 3D extra-stream including the user-selected target and secure (reserve) necessary QoS (step S104).

The home router 110 having received the instruction from the 2D/3D stream media client 103 in step S104 notifies the 2D/3D stream media client 103 of the result of joining the multi-cast of the 3D extra-stream including the user-selected target and securing the necessary QoS (step S105).

Specifically, the home router 110 performs multi-cast participation for an address of the target stream of the user-selected channel (3D Extra-Stream URL). For example, a join command of IGMP protocol may be issued for the multi-cast participation. Where the network supports a function of reserving QoS such as a band, the home router 110 secures a band on the network necessary for the target stream, and network resources such as quality, based on the Required Transport QoS. Protocol such as IMS (see http://wbb.forum.impressrd.jp/feature/20060720/165) may be used to secure the network resources. When the network resources have been smoothly secured and stream transmission is ready, the home router 110 notifies the 2D/3D stream media client 103 of the fact that the network resources have been smoothly secured and the stream transmission is ready.

At least two 3D extra-streams are then transmitted using multi-cast from the 2D/3D stream media server 22 (step S106). The 2D/3D stream media client 103 sends a request for reproduction of the 2D stream and the 3D extra-stream to the home router 110 (step S107). The home router 110 having received the request for reproduction of the 2D stream and the 3D extra-stream in step S107 sends a target stream of the user-selected channel in the 3D extra-stream transmitted from the 2D/3D stream media server 22, to the 2D/3D stream media client 103 (step S108).

The acquisition by the tuner 101 of the 2D stream transmitted from the 2D/3D stream media server 22 via the unidirectional network is performed simultaneously with the acquisition of the 3D extra-stream transmitted from the 2D/3D stream media server 22 via the Internet. The client 100 reproduces content that is a combination of the 2D stream transmitted from the 2D/3D stream media server 22 via the unidirectional network and the 3D extra-stream acquired from the Internet.

Channel change can be rapidly performed for a 3D channel corresponding to the stream for which the home router 110 has been successful in the multi-cast participation and the necessary network resources have been secured in step S105. When the user switches a channel using, for example, a channel selection button of a remote controller and the metadata client 102 notifies the 2D/3D stream media client 103 of the switching to the user-designated channel (step S109), the 2D/3D stream media client 103 sends a request for reproduction of a 2D stream and a 3D extra-stream other than the stream designated by the metadata client 102 and requested for reproduction in step S107, to the home router 110 (step S110). The home router 110 having received the request for reproduction of the 2D stream and the 3D extra-stream in step S110 sends a target stream of the user-selected channel in the 3D extra-stream transmitted from the 2D/3D stream media server 22, to the 2D/3D stream media client 103 (step S111).

Thus, in the first example of operation, it is possible to realize rapid channel switching in the client 100 by joining the 3D extra-stream multi-cast in advance.

[2-4-2. Second Example of Operation]

FIG. 8 is a flow diagram illustrating a second example of operation of the server 20 and the client 100 according to an embodiment of the present invention. Hereinafter, the second example of operation of the server 20 and the client 100 according to an embodiment of the present invention will be described with reference to FIG. 8. In the second example of operation, a channel zapping process for a plurality of 3D streams in the client 100 when streams are pre-cached in a local storage is shown.

First, metadata is transmitted from the metadata server 21 of the server 20 via the unidirectional network 11 or the bidirectional network 12 prior to a 3D program (step S121). When the client 100 receives the metadata transmitted from the metadata server 21 via the unidirectional network 11 or the bidirectional network 12, the metadata client 102 of the client 100 parses the received metadata. Here, the metadata client 102 presents the received metadata to the user of the client 100 or requests the user to select a channel (step S122).

When the metadata client 102 presents the received metadata to the user of the client 100 or requests the user to select the channel, and the user of the client 100 selects the channel in step S122, the metadata client 102 notifies the 2D/3D stream media client 103 that the user-selected channel is to be received (step S123). The 2D/3D stream media client 103 having received the notification from the metadata client 102 requests the home router 110 to pre-cache 3D extra-streams including the user-selected target (step S124).

The home router 110 having received the request to pre-cache a plurality of 3D extra-streams from the 2D/3D stream media client 103 acquires a designated file from the 2D/3D stream media server 22 of the server 20 using address information of the target stream file (3D Extra-Stream Download-URL). The file acquisition by the home router 110 may be performed, for example, according to HTTP protocol or another communication protocol. The 2D/3D stream media server 22 transmits the designated file to the home router 110 (step S125). The home router 110 pre-caches the file transmitted from the 2D/3D stream media server 22. The file may be pre-cached in a storage device included in the home router 110, a storage device in the client 100, or a storage device connected to the home router 110 and provided separately from the client 100 or the home router 110. Hereinafter, it is assumed that the file is pre-cached in the storage device included in the home router 110. When the file acquisition by the home router 110 has been smoothly performed and the stream transmission has been prepared, the 2D/3D stream media client 103 is notified of the fact that the file acquisition has been smoothly performed and the stream transmission has been prepared (step S126).

The acquisition by the tuner 101 of the 2D stream transmitted from 2D/3D stream media server 22 via the unidirectional network is performed simultaneously with the acquisition of the 3D extra-stream pre-cached by the home router 110. The client 100 reproduces content that is a combination of the 2D stream transmitted from the 2D/3D stream media server 22 via the unidirectional network and the 3D extra-stream pre-cached by the home router 110. Specifically, when the 2D/3D stream media client 103 requests the home router 110 to reproduce the 2D stream and the 3D extra-stream (step S127), the home router 110 transmits the pre-cached file to the 2D/3D stream media client 103 (step S128).

It is possible to rapidly switch a channel to a 3D channel corresponding to the stream successfully pre-cached by the home router 110. When the user switches a channel, for example, using a channel selection button of a remote controller and the metadata client 102 notifies the 2D/3D stream media client 103 of the switching to the user-designated channel (step S129), the 2D/3D stream media client 103 sends a request for reproduction of a 2D stream and a 3D extra-stream other than the stream designated by the metadata client 102 and requested for reproduction in step 5127, to the home router 110 (step S130). The home router 110 having received the request for reproduction of the 2D stream and the 3D extra-stream in step S130 transmits the pre-cached file corresponding to the user-selected channel in the 3D extra-stream transmitted from the 2D/3D stream media server 22, to the 2D/3D stream media client 103 (step S131).

Thus, in the second example of operation, it is possible to realize fast channel switching in the client 100 by pre-caching the 3D extra-stream file in the client.

[2-4-3. Third Example of Operation]

FIG. 9 is a flow diagram illustrating a third example of operation of the server 20 and the client 100 according to an embodiment of the present invention. Hereinafter, the third example of operation of the server 20 and the client 100 according to an embodiment of the present invention will be described with reference to FIG. 9. In the third example of operation, multi-cast stream acquisition is scheduled in advance, and the client 100 performs channel-zapping on a plurality of 3D streams.

First, metadata is transmitted from the metadata server 21 of the server 20 via the unidirectional network 11 or the bidirectional network 12 prior to a 3D program (step S141). When the client 100 receives the metadata transmitted from the metadata server 21 via the unidirectional network 11 or the bidirectional network 12, the metadata client 102 in the client 100 pre-schedules joining of the multi-cast of the 3D extra-stream and securing (reserving) of the necessary QoS, based on the received metadata, and joins the multi-cast of the 3D extra-stream and secures the necessary QoS through the home router 110 according to the scheduling (step S142).

In step S142, the acquisition of a multi-cast 3D extra-stream that an end user is likely to select is pre-scheduled based on the metadata provided from the metadata server 21, and reservation of securing of the resources or QoS is performed through the home router 110 based on the scheduling. Here, for example, an end-user preference database provided inside the client 100 may be used as a determination basis for the end user's selection.

Figure 10A:
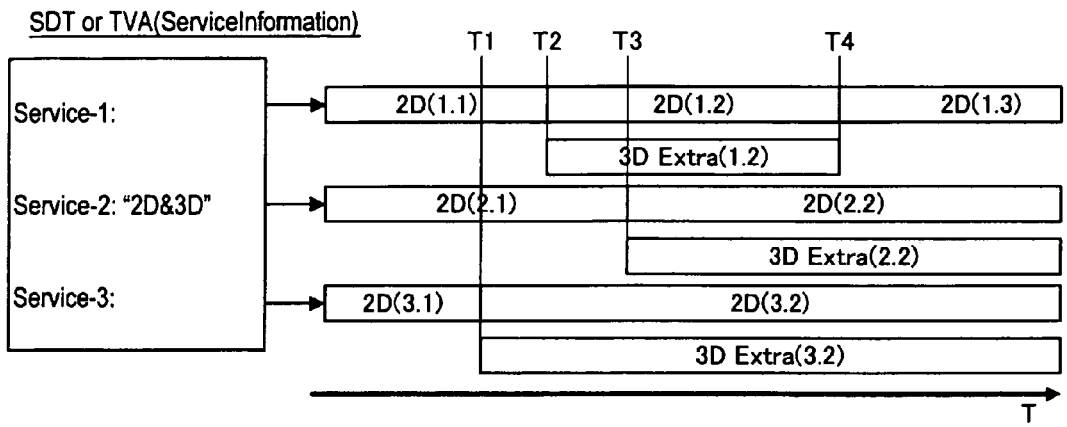
FIG. 10A is a diagram illustrating an example of a mixing state of streams using ServiceInformation of an SDT or TVA of an SI.
Figure 10B:
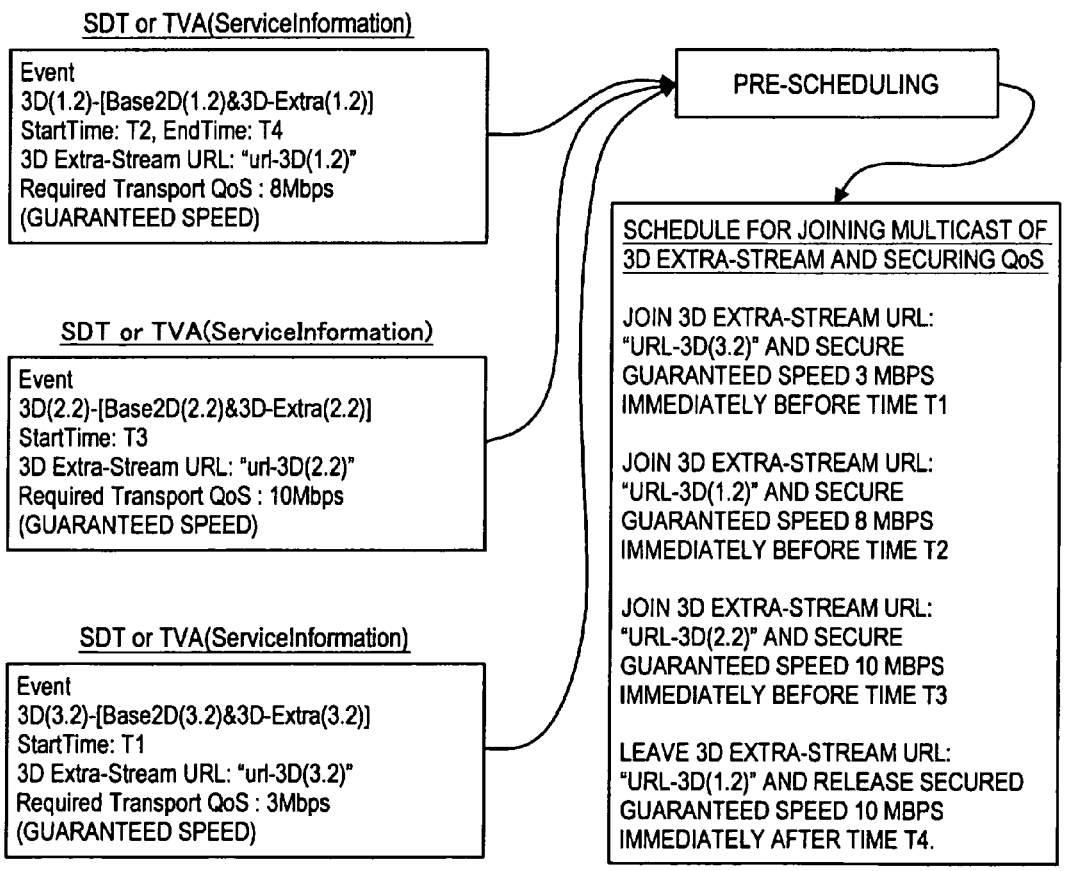
FIG. 10B is a diagram illustrating an example of pre-scheduling using ScheduleEvent of an EIT or the TVA of the SI.
Figure 11:
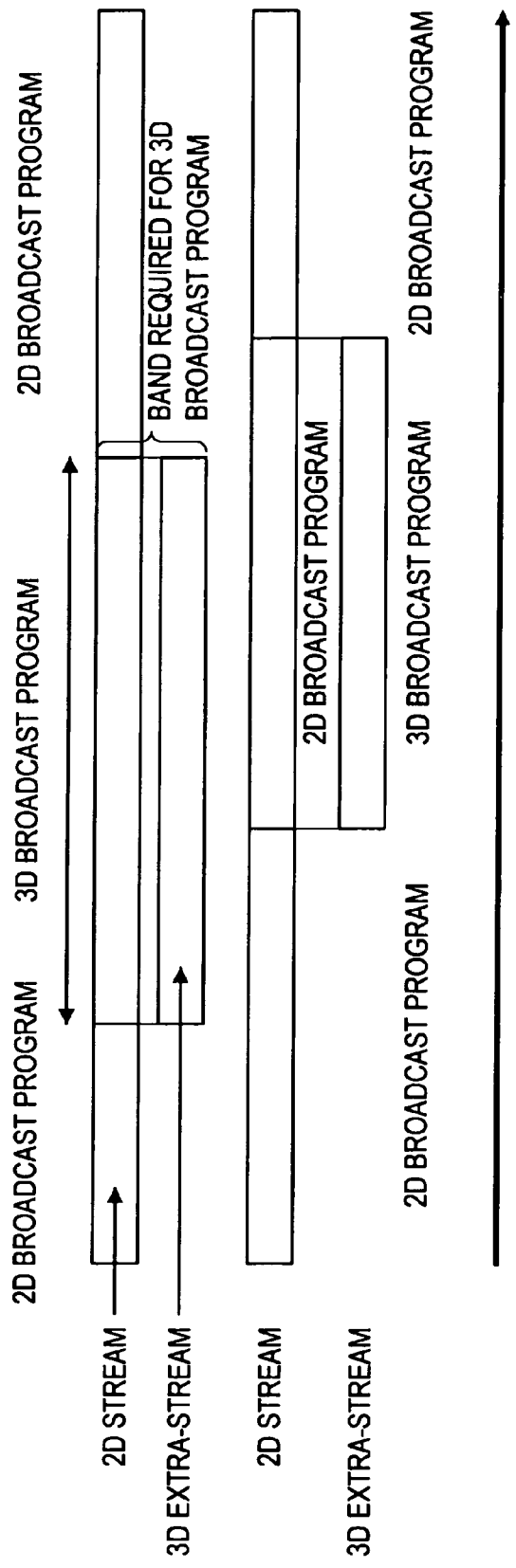
FIG. 11 is a diagram illustrating a stream configuration in MVC.

FIGS. 10A and 10B are diagrams illustrating reservation for securing of resources and QoS performed by the metadata client 102 for the home router 110 based on the pre-scheduling of the multi-cast 3D extra-stream acquisition. FIG. 10A shows an example of a mixing state of streams using Service-Information of an SDT or a TVA of an SI, and FIG. 10B shows an example of pre-scheduling using ScheduleEvent of the EIT or the TVA of the SI is shown.

FIG. 10A will be described. At a time T1, multi-cast 3D extra-stream distribution starts in Service-3. In a period from a time T2 to a time T4, the multi-cast 3D extra-stream is distributed in Service-1. At a time T3, the multi-cast 3D extra-stream distribution starts in Service-2.

Subsequently, FIG. 10B will be described. In Service-1, a start time of a multi-cast 3D extra-stream is T2, an end time is T4, a URL of a distribution source for the stream is "url-3D (1.2)," and QoS (guaranteed speed) of the stream is 8 Mbps, as shown in FIG. 10B. Similarly, in Service-2, the start time of the multi-cast 3D extra-stream is T3, a URL of the stream distribution source is "url-3D(2.2)," and QoS (guaranteed speed) of the stream is 10 Mbps. Similarly, in Service-3, the start time of the multi-cast 3D extra-stream is T1, the URL of the stream distribution source is "url-3D(3.2)," and QoS (guaranteed speed) of the stream is 3 Mbps.

Based on this information, the metadata client 102 pre-schedules the multi-cast 3D extra-stream acquisition. As a result, in the example shown in FIG. 10B, the metadata client 102 schedules to join the 3D extra-stream URL: "url-3D (3.2)" and secure the guaranteed speed 3 Mbps immediately before the time T1, to join the 3D extra-stream URL: "url-3D (1.2)" and secure the guaranteed speed 8 Mbps immediately before the time T2, to join the 3D extra-stream URL: "url-3D (2.2)" and secure the guaranteed speed 10 Mbps immediately before the time T3, and to leave the 3D extra-stream URL: "url-3D(1.2)" and release the secured guaranteed speed 10 Mbps immediately after the time T4.

When the home router 110 receives the notification indicating that the multi-cast of the 3D extra-stream is to be joined and the necessary QoS is to be secured, from the metadata client 102, the home router 110 joins the multi-cast of the 3D extra-stream and secures the necessary QoS and notifies the 2D/3D stream media client 103 of the result (step S143). Specifically, when the metadata client 102 requests to join the multi-cast for a plurality of 3D extra-streams and secure the necessary QoS, the home router 110 performs the multi-cast participation for an address of the target stream (3D Extra-Stream URL). The multi-cast participation may be executed, for example, by issuing a join command of IGMP protocol. When the network supports a function of reserving QoS such as a band, the home router 110 secures a band on the network necessary for the target stream, and network resources such as quality. The band on the network necessary for the target stream is secured based on, for example, Required Transport QoS information included in the metadata transmitted from the metadata server 21. The network resources such as quality may also be secured, for example, by a protocol such as IMS (http://wbb.forum.impressrd.jp/feature/20060720/165).

When the network resources have been smoothly secured and the stream transmission is ready, the 2D/3D stream media client 103 is notified of this fact.

The metadata client 102 then instructs the 2D/3D stream media client 103 to select the 3D extra-stream based on the pre-scheduling in step S142 (step S144).

The 2D/3D stream media server 22 transmits a plurality of multi-cast 3D extra-streams (step S145). The home router 110 transmits the 3D extra-stream instructed in step S144 in the stream transmitted from the 2D/3D stream media server 22, to the 2D/3D stream media client 103 (step S147).

In the tuner 101, acquisition of a 2D stream transmitted from the 2D/3D stream media server 22 via the unidirectional network is performed together with the acquisition of the 3D extra-stream transmitted from the 2D/3D stream media server 22. The 2D/3D stream media client 103 reproduces content that is a combination of the 2D stream transmitted from the 2D/3D stream media server 22 via the unidirectional network and the 3D extra-stream selected by the instruction from the metadata client 102 (step S146).

Channel change can be rapidly processed for a 3D channel corresponding to the stream for which the home router 110 has been successful in the multi-cast participation and the necessary network resources have been secured in step S143. When the user switches the channel using, for example, a channel selection button of a remote controller and the metadata client 102 notifies the 2D/3D stream media client 103 of the switching to the user-designated channel (step S148), the 2D/3D stream media client 103 sends a request for reproduction of a 2D stream and a 3D extra-stream other than the stream designated by the metadata client 102 to the home router 110.

The home router 110 having received the request to reproduce the 2D stream and the 3D extra-stream sends a target stream of the user-selected channel in the 3D extra-stream transmitted from the 2D/3D stream media server 22, to the 2D/3D stream media client 103 (step S150). The 2D/3D stream media client 103 reproduces content that is a combination of the 2D stream transmitted from the 2D/3D stream media server via the unidirectional network and the 3D extra-stream selected by the instruction from the metadata client 102 (step S149).

Thus, in the third example of operation, it is possible to realize rapid channel switching in the client 100 by pre-scheduling the 3D extra-stream acquisition.

<3. Conclusion>

As described above, according to the embodiment of the present invention, the server 20 transmits the metadata describing the mixing state of the 3D extra-stream and diverse information on the 3D extra-stream. The client 100 receives the metadata transmitted from the server 20, and performs the multi-cast participation and network resource securing in advance or pre-caches files necessary for 3D stream reproduction, based on the metadata. This enables the client 100 to perform rapid channel zapping when the 3D broadcast program is broadcast.

A series of processes described above may be executed by hardware or software. Where the series of processes are executed by the software, a program constituting the software is installed from a program recording medium in a computer integrated in dedicated hardware, or in, for example, a general-purpose personal computer or the like that is capable of executing various functions by installing various programs.

Furthermore, the communication may be not only wireless communication and wired communication, but also a combination of the wireless communication and the wired communication, that is, a communication in which the wireless communication is performed in one period and the wired communication is performed in the other period. Further, the communication may take place in such a way that communication from one device to another device is performed as wired communication and communication from the other device to the one device is performed as wireless communication.

It should be understood by those skilled in the art that various modifications, combinations, sub-combinations and alterations may occur depending on design requirements and other factors insofar as they are within the scope of the appended claims or the equivalents thereof.

What is claimed is:

1. A stream receiving device comprising:
an information receiving unit for receiving stream control information for a 3D stream to be distributed from an exterior over a network, the stream control information being described using metadata;
a stream securing unit for executing a process related to securing of the 3D stream to be distributed using the stream control information received by the information receiving unit before the 3D stream is distributed, and reserving the stream; and
a stream receiving unit for receiving the 3D stream distributed over the network based on the result of reservation in the stream securing unit,
wherein the control information includes an indication that a mixing state of the 3D stream and a 2D stream is one of (i) 2D stream only and (ii) 2D stream and 3D stream.

2. The stream receiving device according to claim 1, wherein the stream securing unit executes, in advance, a process of joining a multi-cast for one or at least two 3D streams distributed using multi-cast from the exterior, and secures the 3D stream.

3. The stream receiving device according to claim 1, wherein the stream securing unit pre-caches the 3D stream to secure the 3D stream before one or at least two 3D streams are reproduced.

4. The stream receiving device according to claim 1, wherein the stream securing unit schedules a process of joining a multi-cast for one or at least two 3D streams distributed using multi-cast from the exterior, and secures the 3D stream.

5. The stream receiving device according to claim 1, wherein band information of the 3D stream is described in the control information received by the information receiving unit.

6. The stream receiving device according to claim 1, wherein a distribution scheme for the 3D stream is described in the control information received by the information receiving unit.

7. The stream receiving device according to claim 1, wherein a time at which the 3D stream can be downloaded is described in the control information received by the information receiving unit.

8. A stream receiving method, comprising the steps of:
receiving stream control information for a 3D stream to be distributed from the exterior over a network, the stream control information being described using metadata;
executing a process related to securing of the 3D stream to be distributed using the stream control information received in the step of receiving the stream control information before the 3D stream is distributed, and reserving the stream; and
receiving the 3D stream distributed over the network based on the result of reservation in the step of reserving the stream,
wherein the control information includes an indication that a mixing state of the 3D stream and a 2D stream is one of (i) 2D stream only and (ii) 2D stream and 3D stream.

9. A computer program that causes a computer to execute the steps of:
receiving stream control information for a 3D stream to be distributed from the exterior over a network, the stream control information being described using metadata;
executing a process related to securing of the 3D stream to be distributed using the stream control information received in the step of receiving the stream control information before the 3D stream is distributed, and reserving the stream; and
receiving the 3D stream distributed over the network based on the result of reservation in the step of reserving the stream,
wherein the control information includes an indication that a mixing state of the 3D stream and a 2D stream is one of (i) 2D stream only and (ii) 2D stream and 3D stream.

* * * * *